United States Patent
McGinniss et al.

(10) Patent No.: US 6,590,053 B2
(45) Date of Patent: Jul. 8, 2003

(54) SUPERCRITICAL FLUID PRESSURE SENSITIVE ADHESIVE POLYMERS AND THEIR PREPARATION

(75) Inventors: Vincent D. McGinniss, Sunbury, OH (US); Bhima R. Vijayendran, Upper Arlington, OH (US); Kevin B. Spahr, Worthington, OH (US); Kazuhiko Shibata, Ibaraki (JP); Takayuki Yamamoto, Ibaraki (JP)

(73) Assignee: Nitto Denko Corporation, Tokyo (JP)

( * ) Notice: Subject to any disclaimer, the term of this patent is extended or adjusted under 35 U.S.C. 154(b) by 0 days.

(21) Appl. No.: 09/964,096

(22) Filed: Sep. 26, 2001

(65) Prior Publication Data

US 2002/0035225 A1 Mar. 21, 2002

Related U.S. Application Data

(62) Division of application No. 09/181,456, filed on Oct. 28, 1998, now Pat. No. 6,444,772.

(51) Int. Cl.[7] .................................................. C08F 20/06
(52) U.S. Cl. .................... 526/317.1; 526/328; 526/942; 526/203; 526/318.4; 526/242
(58) Field of Search ................................ 526/528, 942, 526/203, 317.1, 318.4, 242

(56) References Cited

U.S. PATENT DOCUMENTS

| | | | | |
|---|---|---|---|---|
| 5,066,522 A | * | 11/1991 | Cole et al. ................... | 427/422 |
| 5,407,132 A | * | 4/1995 | Messerly et al. ............ | 239/124 |
| 5,478,905 A | * | 12/1995 | Anolick et al. .............. | 526/254 |
| 5,780,565 A | * | 7/1998 | Clough et al. ............... | 526/206 |
| 5,824,726 A | * | 10/1998 | DeSimone et al. .......... | 524/424 |

FOREIGN PATENT DOCUMENTS

| | | | |
|---|---|---|---|
| DE | 3609829 | * | 9/1987 |
| EP | 8 818 470 A | * | 1/1998 |
| GB | 1172713 | * | 12/1969 |

OTHER PUBLICATIONS

DeSimone et al., "Dispersion Polymerizations in Supercritical Carbon Dioxide", Science, vol. 265, pp 356–359 (Jul. 15, 1994).*

* cited by examiner

*Primary Examiner*—David W. Wu
*Assistant Examiner*—Ling-Siu Choi
(74) *Attorney, Agent, or Firm*—Mueller and Smith, LP

(57) ABSTRACT

Pressure sensitive adhesive (PSA) polymers, especially low $T_g$, high tack, nonpolar and polar polymers useful in formulating PSA can be solubilized or dispersed in a supercritical fluid (SCF), such as liquid $CO_2$ or supercritical $CO_2$, using an organic cosolvent such as toluene. PSA polymers can be polymerized in SCF fluids to make unique adhesive products. Inclusion of a fluorinated reactant in the SCF polymerization process yields a PSA with improved resistance to mineral oil.

4 Claims, No Drawings

SUPERCRITICAL FLUID PRESSURE SENSITIVE ADHESIVE POLYMERS AND THEIR PREPARATION

CROSS-REFERENCE TO RELATED APPLICATIONS

This application is a divisional application of U.S. Ser. No. 09/181,456, filed Oct. 28, 1998, now U.S. Pat. No. 6,444,772B1, the disclosure of which is expressly incorporated herein by reference.

STATEMENT REGARDING FEDERALLY SPONSORED RESEARCH

Not applicable.

BACKGROUND OF THE INVENTION

The present invention relates to the preparation of pressure sensitive adhesive ("PSA") polymers and more particularly to their preparation in supercritical fluid ("SCF") reactive medium.

A variety of coatings have been developed as a response to customer and government demands that volatile organic compounds ("VOCs") be reduced and/or eliminated from coatings formulations. These include, inter alia, powder coatings, water-borne coatings, high solids organic solvent coatings, and SCF coatings. The use of supercritical fluids as carriers and viscosity reducers for transporting a variety of coating materials and effectively spraying them onto a coatable surface while reducing the amount of VOCs that are required for application has been proposed in a number prior publications. A good review of these publications can be found in, for example, U.S. Pat. No. 5,212,229. Performance reports on SCF coatings can be found, for example, in Goad, et al., "Supercritical Fluid (SCF) Application of SMC Primers: Balancing Transfer Efficiency and Appearance", SPI Compos Inst Annu Conf Expo, *Proc J Soc Plast Ind*, vol. 5, $2^{nd}$ page, Session 21A (1997); and Nielsen, et al., "Supercritical Fluid Coating: Technical Development of a New Pollution Prevention Technology", *Water-Borne & Higher-Solids, and Powder Coatings Symposium*, Feb. 24–26, 1993 New Orleans, La., sponsored by The University of Southern Mississippi Department of Polymer Science and Southern Society for Coatings Technology.

Use of SCF technology in the adhesives field, however, has been given little consideration by the art. The present invention, then, is addressed to implementing SCF technology for PSA adhesives.

BRIEF SUMMARY OF THE INVENTION

One aspect of the present invention relates to stabilizing or dispersing pressure sensitive adhesive (PSA) polymers, especially low $T_g$, high tack, nonpolar and polar polymers useful in formulating PSAs, in a supercritical fluid (SCF), such as liquid $CO_2$ or supercritical $CO_2$, by using an organic cosolvent such as toluene. Another aspect of the present invention reveals that PSA polymers can be polymerized in SCF fluids to make unique adhesive products. Inclusion of a fluorinated reactant in the SCF polymerization process yields a PSA with improved resistance to mineral oil.

In this application the term (co)polymer means either a polymer or copolymer, which includes a homopolymer. The term (co)polymerization means either polymerization or copolymerization, which includes homopolymerization. Further, the term (meth)acrylate means either acrylate or methacrylate.

DETAILED DESCRIPTION OF THE INVENTION

The present invention extends the use of fluid $CO_2$ or supercritical $CO_2$ to PSA adhesive systems from its use in coatings systems as proposed in the art. The present invention is based upon several fundamental discoveries with respect to PSA systems and fluid $CO_2$ or supercritical $CO_2$. Initially, certain classes of cosolvents are required in order to stabilize conventional PSA (co)polymers in fluid $CO_2$ or supercritical $CO_2$. Next, it was discovered that PSA (co) polymers could be synthesized in fluid $CO_2$ or supercritical $CO_2$ as the reaction solvent, even to the exclusion of other conventional organic solvents. Further, it was discovered that improved oil and fuel resistance could be imparted to PSA polymers synthesized in fluid $CO_2$ or supercritical $CO_2$ by including a fluorinated monomer in the reaction mixture.

Referring initially to the use of certain classes of cosolvents to stabilize conventional PSA polymers in fluid $CO_2$ or supercritical $CO_2$, different classes of cosolvents will be required to polar (e.g., acrylics) than for nonpolar (e.g., polybutene) PSAs. For ester type cosolvents for dissolving or dispersing polybutene (typical nonpolar PSA polymer) in fluid $CO_2$ or supercritical $CO_2$, the cosolvent should possess the following characteristics: molecular weight range of 116–297, density range of 0.855–0.898, and $\chi_o$ factor (oxygen heteroatoms) of 0.108–0.275. For alcohol type cosolvents, the cosolvent should possess the following characteristics: molecular weight range of 144–186, density range of 0.827–0.831, and $\chi_o$ factor (oxygen heteroatoms) of 0.086–0.111. Finally, for hydrocarbon type cosolvents, the cosolvent should possess the following characteristics: molecular weight range of 86–227, density range of 0.659–0.865, and $\chi_o$ factor (oxygen heteroatoms) of 0.

The $\chi$ (chi) factor is based upon the McGinniss predictive relationship as defined in *Organic coatings in Plastic Chemistry*, Vols. 39 and 46, pp. 529–543 and 214–223, respectively (1978 and 1982, respectively). The McGinniss predictive relationship defines the $\chi$ factor as a weight fraction of heteroatoms contained in the monomer or in the monomer repeat unit of an oligomer or polymer.

In adjudging suitable cosolvents, polybutene (MW range of 66,000 to 107,000) was dissolved in fluid $CO_2$ or supercritical $CO_2$ in equal weight parts with the cosolvent and the number of milliliters of $CO_2$ that can be added to a one gram same of the mixture and still remain a clear solution or form a stable dispersion recorded (Solubility Number). Representative such cosolvents, then, are displayed below.

| | Cosolvent | | | $\chi$ | Solubility |
|---|---|---|---|---|---|
| No. | Type | MW | Density | Factor | Number |
| 1 | Trans-2-hexenyl acetate | 142.20 | 0.898 | 0.225 | 2.24 |
| 2 | Ethyl trans-3-hexenoate | 142.20 | 0.896 | 0.225 | 2.37 |
| 3 | Methyl caproate | 130.19 | 0.885 | 0.246 | 2.86 |
| 4 | Isobutyl isobutyrate | 144.21 | 0.855 | 0.222 | 2.92 |
| 5 | Butyl acetate | 116.16 | 0.862 | 0.275 | 3 |
| 6 | Butyl methacrylate | 142.20 | 0.894 | 0.225 | 3.52 |
| 7 | Hexyl acetate | 144.21 | 0.876 | 0.222 | 4.32 |
| 8 | Butyl butyrate | 144.22 | 0.871 | 0.222 | 4.36 |
| 9 | Pentyl Propionate | 144.21 | 0.873 | 0.222 | 4.45 |
| 10 | Methyl ethanoate | 144.22 | 0.870 | 0.222 | 4.53 |
| 11 | Ethyl caproate | 144.21 | 0.873 | 0.222 | 4.66 |
| 12 | Methyl dodecanoate | 186.30 | 0.873 | 0.172 | 4.82 |
| 13 | 2-Ethylbutyl acetate | 144.21 | 0.876 | 0.222 | 4.91 |
| 14 | Methyl oleate | 296.50 | 0.867 | 0.108 | 5.4 |

-continued

| | Cosolvent | | | χ | Solubility |
|---|---|---|---|---|---|
| No. | Type | MW | Density | Factor | Number |
| 15 | Dodecyl acetate | 228.38 | 0.865 | 0.140 | 6.39 |
| 16 | Methyl tridecanoate | 228.38 | 0.864 | 0.140 | 6.42 |
| 17 | Soybean oil methyl esters | 250 | 0.875 | 0.128 | 8.48 |
| 18 | Hexane | 86.16 | 0.659 | 0 | 3.93 |
| 19 | Heptane | 100.21 | 0.684 | 0 | 4.26 |
| 20 | Tetradecane | 198.40 | 0.763 | 0 | 4.76 |
| 21 | Hexadecane | 226.45 | 0.773 | 0 | 5.07 |
| 22 | Toluene | 92.14 | 0.865 | 0 | 5.24 |
| 24 | 1-Hexadecene | 224.42 | 0.783 | 0 | 6.63 |
| 25 | 1-Dodecanol | 186.34 | 0.831 | 0.086 | 2.88 |
| 26 | 1-Nonanol | 144.26 | 0.827 | 0.111 | 5.86 |

Cosolvents 1–17 are esters, cosolvents 18–24 are hydrocarbons, and cosolvents 25 and 26 are alcohols. The weight ratio of (co)polymer to solvent can vary from, say, about 0.5 to 2.

One of the major uses or PSAs is to adhere trim and decals on a variety of transportation vehicles (automobiles, buses, trains, tractors, trucks, boats, etc.). Current PSA technology typically uses acrylic based (co)polymers which have excellent adhesion to a variety of polar (painted, non-painted, and active) surfaces. The major problem with current acrylic PSAs is their poor resistance to oils, fuels, and greases commonly found around transportation applications and environments. One aspect of the present invention is the use of special fluorine containing monomers that greatly enhance the oil and fuel resistance of the acrylic PSA, while still maintaining it tack and good adhesive bonding properties.

By using liquid $CO_2$ or in supercritical $CO_2$ fluids as the polymerization vehicle or media, new (co)polymers can be made from low $T_g$ acrylic monomers in combination with fluorinated (meth)acrylic monomers. Representative low $T_g$ acrylic monomers are ethyl acrylate, butyl acrylate, hexyl acrylate, octyl acrylate, and dodecyl acrylate. Representative fluorinated (meth)acrylic monomers include trifluoromethylacrylate and trifluoromethylmethacrylate. As the examples will demonstrate that tack values can be formulated to range from between about 480 to 0 by varying the amount of butyl acrylate and fluorinated octylmethacrylate. Resistance to mineral oil, however, can range on up to 30 minutes. An additional advantage of using liquid $CO_2$ or in supercritical $CO_2$ fluids as the (co)polymerization vehicle is that no additional organic solvents are required and the fluorinated monomers assist in stabilizing the PSA (co)polymer product.

Referring now to suitable polymerizable monomers, broadly, such monomers include any ethylenically unsaturated monomer or oligomer which can be (co)polymerized in the presence of a the initiator. In adhesives technology, acrylic or acrylate compounds find wide acceptance in industry. Another suitable class of ethylenically unsaturated compounds is vinyl compounds, while a third broad class are compounds containing backbone ethylenic unsaturation as typified by ethylenically unsaturated polyester oligomers.

Referring with more particularity to reactive acrylic or acrylate monomers or oligomers, a variety of monoacrylate monomers find use in accordance with the present invention. Monoacrylates include, for example, allyl (meth)acrylate, $C_1$–$C_{12}$ alkyl and cycloalkyl (meth)acrylates, such as, for example, butyl acrylate, 2-ethylhexyl acrylate, isooctylacrylate, amyl acrylate, lauryl acrylate, iso-propyl acrylate, and the like, and corresponding monomethacrylates which include, for example, benzyl methacrylate, stearyl methacrylate, decyl methacrylate, cyclohexyl methacrylate, and the like, and mixtures thereof. The foregoing monomers are merely representative and not limitative of the list of acrylate and methacrylate monomers suitable for use in the present invention as those skilled in the art will appreciate.

(Co)polymerization conditions comprehend the use of initiator systems appropriate for the (co)monomers involved in the reaction scheme in kind and amount as taught in the art. Temperatures also conventional, although employment of reaction temperatures as low as room temperature can be practiced on occasion due to the use of liquid $CO_2$ or in supercritical $CO_2$ fluids as the reaction media. Pressures, of course, are appropriate for creating liquid $CO_2$ or in supercritical $CO_2$ fluids, again as known in the art.

In this application, all units are in the metric system unless otherwise expressly indicated. Also, all citations are expressly incorporated herein by reference.

EXAMPLES

Example I

It is well known that polymers (especially low $T_g$, high tack, nonpolar and polar polymers) used in PSAs are not soluble or dispersible in liquid $CO_2$ or in supercritical $CO_2$ fluids. Use of certain cosolvents that possess the correct molecular weight, density, and χ factor, however, can be used to dissolve or disperse PSA polymers in liquid or supercritical $CO_2$ fluids. In order to demonstrate this aspect of the present invention, PSA polymers were mixed at a 1:1 weight ratio in either liquid $CO_2$ or in supercritical $CO_2$ with and without the addition of toluene solvent. The following results were recorded.

TABLE I

| PSA Polymer* | Liquid $CO_2$ | Supercritical $CO_2$ | Cosolvent | Solution or Dispersion |
|---|---|---|---|---|
| Polybutene | Yes | Yes | No | No |
| Polyisobutylene | Yes | Yes | No | No |
| Natural Rubber | Yes | Yes | No | No |
| Polybutylacrylate | Yes | Yes | No | No |
| Polybutene | Yes | Yes | Yes | Yes |
| Polyisobutylene | Yes | Yes | Yes | Yes |
| Natural Rubber | Yes | Yes | Yes | Yes |
| Polybutylacrylate | Yes | Yes | Yes | Yes |
| Silicones | Yes | No | No | Partial |
| Silicones | No | Yes | No | No |
| Silicones | Yes | Yes | Yes | Yes |

*Polybutene: MW 3,000; Polyisobutylene: MW 85,000, Natural Rubber: MW 1,000,000, Polybutylacrylate: MW 700,000

These results demonstrate that a cosolvent must be used in order to obtain a practical dispersion or solution of the PSA polymer.

Specific examples of commercial PSA polymers in cosolvents that are soluble in $CO_2$ are displayed in Table II, below.

TABLE II

| Sample | Polymer PSA Type | Molecular Weight | Wt-% in Toluene | Solubility*** |
|---|---|---|---|---|
| LV-7* | Polybutene | 300 | 50 | Unlimited |
| HV-100* | Polybutene | 1,000 | 50 | 2.47 |
| HV-1900* | Polybutene | 3,000 | 50 | 0.87 |

TABLE II-continued

| Sample | Polymer PSA Type | Molecular Weight | Wt-% in Toluene | Solubility*** |
|---|---|---|---|---|
| Tetlax 3T* | Polyisobutylene | 66,000 | 50 | 0.7 |
| LM-MH** | Polyisobutylene | 85,000 | 50 | 0.66 |
| Tetlax 5T* | Polyisobutylene | 107,000 | 50 | 0.83 |
| MM-L100** | Polyisobutylene | 850,000 | 50 | 1.25 |
| Acrylic | Polybutylacrylate | 700,000 | 22 | 0.72 |
| NR | Natural Rubber | 1,000,000 | 35 | 1.38 |

*Nippon Petrochemical Company Limited
**Exxon Corporation
***ml of $CO_2$ for 1 g of polymer solution at 800–900 psi at 27°/28° C.

A fluid PSA solution or dispersion is a necessary requirement for being able to apply the PSA in thin uniform continuous films on a substrate to be bonded.

Example II

In this example, the preparation of PSA adhesive compositions that are resistant to oils, fuels, and greases commonly found around transportation applications and environments is detailed. Such PSA adhesive compositions are based on PSA polymers prepared in either liquid $CO_2$ or in supercritical $CO_2$ from monomers that include a fluorinated monomer. These polymer preparations either utilized a thermal initiator (azobisisobutyronitrile) at elevated temperature (65° C.) or an organic redox initiator system (benzoyl peroxide and N,N-dimethyl aniline) at room temperature. The polymers prepared below were synthesized from butyl acrylate (BA) and fluorinated octylmethacrylate (FOMA). The following results were recorded.

TABLE III

| Run No. | Formulation (weight parts) | Pressure | Molecular Weight | Polydispersity |
|---|---|---|---|---|
| 1 | BA/AIBN (100/1) | 3,000 | 357,000 | 3.36 |
| 2 | BA/AIBN (100/1) | 3,000 | 304,000 | 4.17 |
| 3 | BA/FOMA/AIBN (90/10/1) | 3,000 | 308,000 | 3.78 |
| 4 | BA/FOMA/AIBN (75/25/1) | 3,000 | 387,000 | 5.95 |
| 5 | BA/FOMA/AIBN (50/50/1) | 3,000 | 101,000 | 2.97 |
| 6 | BA/FOMA/AIBN (25/75/1) | 3,000 | 118,000 | 2.06 |
| 7 | BA/FOMA/AIBN (10/90/1) | 3,000 | 163,000 | 7.79 |
| 8 | BA/AIBN (100/1) | 1,500 | 334,000 | 6.00 |
| 9 | BA (Redox Initiator) | 600 | 137,000 | 3.42 |

Not shown in these data is the ability of the liquid $CO_2$ to stabilize the (co)polymerization process and, thus, create a more uniform product. For example, when polymerizing butyl acrylate in liquid $CO_2$ as in Runs 1 and 2, the resulting polymer dispersion is characterized by large particles that settled out of the fluid. However, the fluorinated copolymer of Run No. was a fine dispersion of polymer that stayed in suspension in the $CO_2$ fluid. Thus, it has been demonstrated that co(polymerization) of PSA polymers can take place in liquid or supercritical $CO_2$ fluid without the presence of conventional volatile organic solvents. The art already demonstrates the advantages in application of coatings from fluid or supercritical $CO_2$. These same advantages will be retained by the inventive PSAs of the present invention.

The properties of the new PSA polymers synthesized above are unique in that the fluorinated monomers control the degree of tack of the PSA and impart excellent mineral oil resistance to the system. Mineral oil resistance was chosen as a measure of PSA polymer resistance to oils, fuels, and greases commonly found around transportation applications and environments. The following data illustrate these properties.

TABLE IV

| PSA System | Tack Value* | Mineral Oil Resistance |
|---|---|---|
| Polybutylacrylate Control (357,000 MW) | 374 | Severe attack in 10 minutes |
| Polybutylacrylate Control (304,000 MW) | 490 | Severe attack in 10 minutes |
| Run No. 3 | 476 | Moderate attack after 30 minutes |
| Run No. 5 | 157 | No attach after 2 hours |

These data demonstrate that the tack value can be controlled as can the mineral oil resistance of the PSA polymers by incorporating a fluorinated monomer in the polymer synthesis and by conducting the synthesis in either fluid $CO_2$ or supercritical $CO_2$.

We claim:

1. A method for forming a stable dispersion of a pressure sensitive adhesive (PSA) polymer in a solvent of supercritical, near supercritical, or subcritical fluid, which consists essentially of dispersing said PSA polymer in a mixture of said fluid and an organic cosolvent.

2. The method of claim 1, wherein said fluid is carbon dioxide.

3. The method of claim 1, wherein said fluid is supercritical carbon dioxide.

4. The method of claim 1, wherein said cosolvent is one or more of toluene, trans-2-hexenyl acetate, ethyl trans-3-hexanoate, methyl capronate, isobutyl isobutyrate, butyl acetate, butyl methacrylate, hexyl acetate, butyl butyrate, pentyl propionate, methyl enanthate, ethyl caproate, methyl dodecanoate, 2-ethylbutyl acetate, methyl oleate, dodecyl acetate, methyl tridecanoate, soybean oil methyl esters, hexane, heptane, tetradecane, hexadecane, 1-hexadecene, 1-dodecanol, or 1-nonanol.

* * * * *